(12) United States Patent
Grether et al.

(10) Patent No.: US 7,195,201 B2
(45) Date of Patent: *Mar. 27, 2007

(54) ADAPTABLE PAYLOAD ENABLING ARCHITECTURE

(75) Inventors: Martin R. Grether, Bothell, WA (US); Raymond R. Reed, Sammamish, WA (US); W. Forrest Frantz, North Bend, WA (US); Gina C. Pischke, Mill Creek, WA (US); Kelly L. Morgan, Renton, WA (US); Paul R. Fortado, Everett, WA (US); Todd Evan Jones, Lake Stevens, WA (US); Douglas W. Hackett, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 144 days.

This patent is subject to a terminal disclaimer.

(21) Appl. No.: 10/811,787

(22) Filed: Mar. 29, 2004

(65) Prior Publication Data

US 2005/0211840 A1    Sep. 29, 2005

(51) Int. Cl.
*B64C 1/20* (2006.01)
(52) U.S. Cl. .............................. 244/118.1; 244/118.5; 410/52
(58) Field of Classification Search ............. 244/118.1, 244/118.5, 118.6, 137.1, 137.2; 410/1, 52
See application file for complete search history.

(56) References Cited

U.S. PATENT DOCUMENTS

| | | | |
|---|---|---|---|
| 2,052,914 A | 9/1936 | Willams | |
| 2,422,693 A | 6/1947 | McArthur | |
| 2,579,003 A | 12/1951 | Josephian | |
| 2,876,969 A | 3/1959 | Tydon et al. | |
| 2,885,133 A | 5/1959 | Nelson | |
| 3,142,461 A | 7/1964 | Naylor | |
| 3,294,034 A | 12/1966 | Bodenhelmer et al. | |
| 3,478,995 A | 11/1969 | Lautzenhiser et al. | |
| 3,578,274 A | 5/1971 | Ginn et al. | |
| 3,877,671 A | 4/1975 | Underwood et al. | |
| 3,904,064 A | 9/1975 | Looker | |
| 3,908,796 A | 9/1975 | Hurwitz | |
| 3,937,298 A | 2/1976 | Hurwitz | |
| 4,000,870 A | 1/1977 | Davies | |
| 4,062,298 A | 12/1977 | Weik | |
| 4,479,621 A | 10/1984 | Bergholz | |
| 4,483,499 A | 11/1984 | Fronk | |

(Continued)

FOREIGN PATENT DOCUMENTS

GB    2167354 A    5/1986

*Primary Examiner*—J. Woodrow Eldred
(74) *Attorney, Agent, or Firm*—Lee & Hayes, PLLC

(57) ABSTRACT

Apparatus and methods for situating and securing payloads to support structures are disclosed. In one embodiment, an assembly includes a support structure, a floor assembly, and a payload assembly. The floor assembly includes a plurality of elongated engagement members coupled to the support structure, the engagement members being spaced apart and mostly parallel, each engagement member including an engagement surface. The payload assembly includes a payload component positioned proximate the floor assembly, and at least one payload support coupled to the payload component and engaged with at least some of the engagement members, the payload support being adapted to beam loads from the payload component to the floor assembly and being moveable with the payload component relative to the floor assembly.

21 Claims, 4 Drawing Sheets

U.S. PATENT DOCUMENTS

| | | | |
|---|---|---|---|
| 4,875,645 A * | 10/1989 | Courter .................. 244/137.1 | |
| 4,911,381 A | 3/1990 | Cannon et al. | |
| 4,929,133 A | 5/1990 | Wiseman | |
| 5,082,088 A | 1/1992 | Krause | |
| 5,083,727 A | 1/1992 | Pompei et al. | |
| 5,090,639 A | 2/1992 | Miller | |
| 5,178,346 A | 1/1993 | Beroth | |
| 5,322,244 A * | 6/1994 | Dallmann et al. ....... 244/118.5 | |
| 5,383,630 A | 1/1995 | Flatten | |
| 5,393,013 A | 2/1995 | Schneider | |
| 5,752,673 A | 5/1998 | Schliwa et al. | |
| 5,823,724 A | 10/1998 | Lee | |
| 5,871,318 A | 2/1999 | Dixon et al. | |
| 6,068,214 A | 5/2000 | Kook et al. | |
| 6,257,522 B1 | 7/2001 | Friend | |
| 6,260,813 B1 | 7/2001 | Whitcomb | |
| 6,302,358 B1 | 10/2001 | Emsters et al. | |
| 6,514,021 B2 | 2/2003 | Delay | |
| 6,554,225 B1 | 4/2003 | Anast | |
| 6,601,798 B2 | 8/2003 | Cawley | |
| 6,619,588 B2 | 9/2003 | Lambiaso | |
| 6,739,281 B1 | 5/2004 | Grimes | |
| 6,875,916 B2 | 4/2005 | Winkelbach et al. | |

* cited by examiner

ADAPTABLE PAYLOAD ENABLING ARCHITECTURE

CROSS REFERENCE TO RELATED APPLICATIONS

This patent application is related to the following co-pending, commonly-owned U.S. patent applications filed concurrently herewith on Mar. 29, 2004, which applications are hereby incorporated by reference: U.S. patent application Ser. No. 10/811,528 entitled "Non-Protruding Seat Track Apparatus and Methods"; U.S. patent application Ser. No. 10/811,529 entitled "Adaptable Payload Apparatus and Methods"; U.S. Patent application Ser. No. 10/811,771 entitled "Adaptable Payload Processes"; and U.S. patent application Ser. No. 11/426,848 entitled "Payload to Support Track Interface and Fitting Apparatus and Methods";

FIELD OF THE INVENTION

This invention relates generally to apparatus and methods for situating and securing payloads to support structures, and more specifically, to adaptable payload enabling architecture.

BACKGROUND OF THE INVENTION

Many aspects of modern commercial aircraft are manufactured in accordance with the particular requirements of the aircraft owner. One such aspect is the arrangement of the various components within the cabin of the aircraft, including the galleys, lavatories, passenger seats, cargo containers, section partitions, and other aircraft components. With conventional payload structure design, additional structure within the cabin of the aircraft is typically added as needed to account for larger than average loading caused by heavy monuments (e.g. lavatories, galleys, etc.) set between the floor and ceiling. When there is a need to move such monuments to different locations within the cabin of the aircraft, the floor, and potentially the walls and ceiling, need to be designed (or redesigned) to account for all potential monument locations.

For example, FIG. 1 is a side, partial cross-sectional view of a conventional floor assembly 50 and a payload assembly 52 in accordance with the prior art. FIG. 2 is a top elevational view of the conventional floor assembly 50 and payload assembly 52 of FIG. 1. The conventional floor assembly 50 includes a plurality of seat tracks 54 that extend longitudinally along the cabin of the aircraft. The seat tracks 54 are adapted to be coupled to a plurality of seat assemblies or other aircraft components, which may be positioned at desired locations along the seat tracks 54. Supplemental support members 56 are interspersed among the seat tracks 54 and extend beneath one or more of the payload assemblies 52 (FIG. 2). A plurality of floor panels 58 are disposed between the seat tracks 54 and the supplemental support members 56. At the edges of the floor panels 58, sealant 60 is installed in the gap between the floor panel 58 edges and seat track 54 & 56 edges and plugs 62 are installed in the unused, exposed portions of the seat tracks 54 and the supplemental support members 56 in some areas of the cabin. Finally, sealing tape (not shown), which is several inches wide, is installed over the sealed gap to minimize leakage between the floor panels 58 and the associated seat tracks 54 and supplemental support members 56.

As shown in FIGS. 1 and 2, the desired locations of the payload assemblies 52 (e.g. galleys, lavatories, etc) often do not align with the seat tracks 54, so that the supplemental support members 56 must be added to carry the loads. To move a payload assembly 52, such as a galley, to make room for changes in seating configuration or changes in layout, a lengthy series of tasks must typically be performed. For example, a galley area mat (not shown) must be removed. Next, payloads where the galley is going to be placed must also be removed (setting off another chain reaction of tasks). Sealing tape and sealant around the initial position of the galley must be removed. Similarly, floor panels around the initial position of the galley must be removed. Sealing and sealing tape around the periphery of each of the floor panels must be removed, and the galley must be disconnected and moved out of the way. Next, old system interfaces must be removed and terminated (e.g. power, electronics, waste, air, heat, etc.), and new system interfaces at the new galley location must be designed, manufactured, and installed. The galley is then moved to the new location and installed, including connection of system interfaces, manufacture and installation of new floor panels, installation of sealant between the floor panels, installation of sealing tape over all floor panel edges, and installation of a new galley mat.

Although desirable results have been achieved using the conventional floor assembly 50 and payload assembly 52, there is room for improvement. For example, the supplemental support members 56 are typically added over the entire portion of the aircraft cabin known as the flex-zone in which the payload assemblies 52 may be desirably located so that they will not need to be added later when a move is desired. Unfortunately, this practice increases manufacturing costs, and also adds unnecessary weight to the aircraft which increases operational costs. Therefore, novel support structures and payload assemblies which at least partially mitigate these characteristics would be useful.

SUMMARY OF THE INVENTION

The present invention is directed to apparatus and methods for situating and securing payloads to support structures. Embodiments of apparatus and methods in accordance with the present invention may advantageously reduce the labor and expense associated with manufacturing a support structure in a passenger cabin of an aircraft, and with moving a payload within a cabin, in comparison with prior art apparatus and methods. Also, embodiments of apparatus and methods in accordance with the present invention may reduce the weight of the support structure, thereby reducing the operating costs of the aircraft.

In one embodiment, an assembly includes a support structure, a floor assembly, and a payload assembly. The floor assembly includes a plurality of elongated engagement members coupled to the support structure, the engagement members being spaced apart and mostly parallel, each engagement member including an engagement surface. The payload assembly includes a payload component positioned proximate to the floor assembly, and at least one payload support coupled to the payload component and engaged with at least some of the engagement members, the payload support being adapted to transfer loads from the payload component to the floor assembly and being moveable with the payload component relative to the floor assembly. The payload support may be a structured floor panel designed to transfer loads from the payload to the floor structure. The payload support might be an intercostal attached to, or resting under a payload floor panel. The payload support might be the outside edge of a partition. All payload supports transfer loads from the payload component to the aircraft structure directly or indirectly thru floor structure.

BRIEF DESCRIPTION OF THE DRAWINGS

The preferred and alternative embodiments of the present invention are described in detail below with reference to the following drawings.

DETAILED DESCRIPTION

The present invention relates to apparatus and methods for situating and securing payloads to support structures, and more specifically, to adaptable payload enabling architecture. Many specific details of certain embodiments of the invention are set forth in the following description and in FIGS. 3–8 to provide a thorough understanding of such embodiments. One skilled in the art, however, will understand that the present invention may have additional embodiments, or that the present invention may be practiced without several of the details described in the following description.

Figure 3:
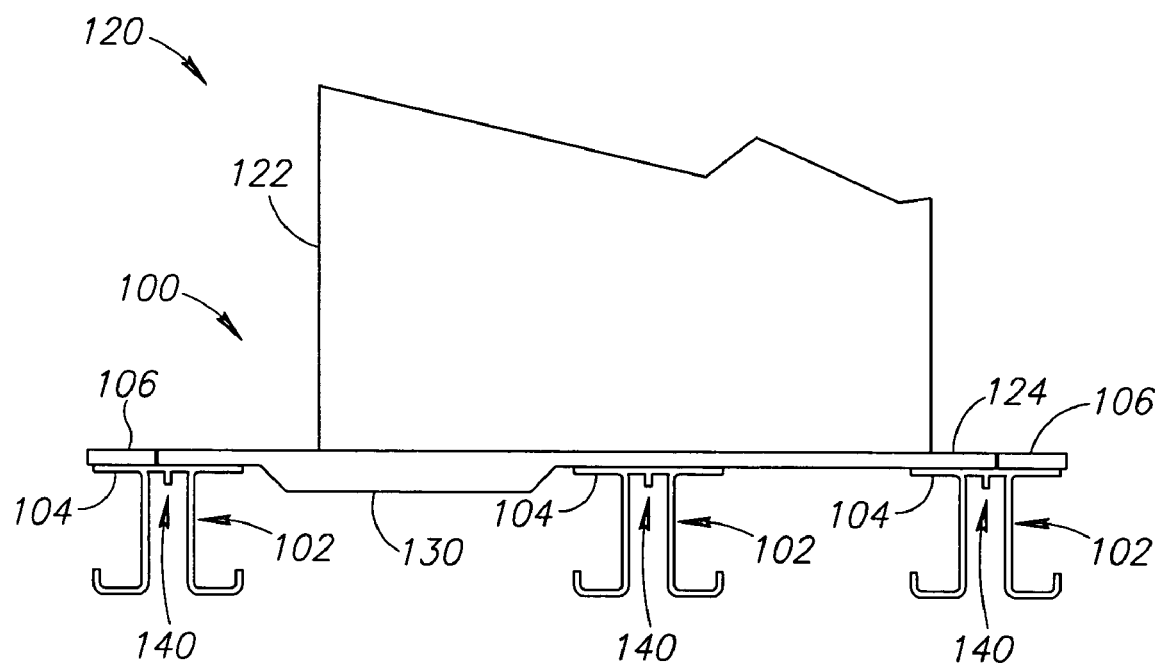
FIG. 3 is a side, partial cross-sectional view of an adaptable payload assembly in accordance with an embodiment of the present invention.
Figure 4:
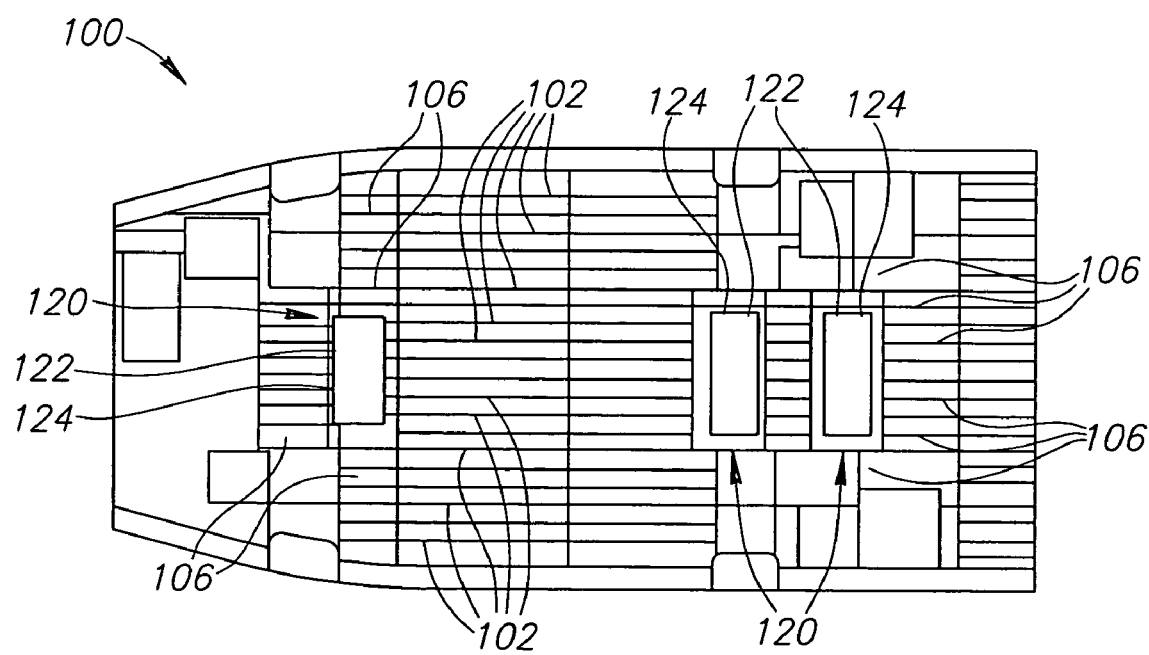
FIG. 4 is a top elevational view of a conventional aircraft floor structure in accordance with an embodiment of the present invention.

FIG. 3 is a side, partial cross-sectional view of a support structure 100 and an adaptable payload assembly 120 in accordance with an embodiment of the present invention. FIG. 4 is a top elevational view of the support structure 100 and the adaptable payload assembly 120 of FIG. 3. In this embodiment, the support structure 100 includes a plurality of floor panels 106, and a plurality of elongated floor supports 102 disposed beneath the floor panels 106 and extending longitudinally along the cabin of the aircraft. Most importantly is what is missing. Special support members, such as supplemental support members 56 of FIG. 1, for payloads are not needed because the payloads can attach to the basic and stable enabling architecture provided by the seat tracks used for the seats. Small and numerous floor panels are not needed because floor panels no longer "break" on special support members and no longer "break" on seat tracks not needed for payload attachment. Instead, larger floor panels can be used which extend over aforementioned special support members and seat tracks.

Each of the floor supports 102 includes an engagement surface 104 (FIG. 3) that engages a lower surface of one or more of the floor panels 106, as described more fully in co-pending, commonly-owned U.S. patent application Ser. No. 10/811,528 entitled "Non-Protruding Seat Track Apparatus and Methods", filed concurrently herewith on Mar. 29, 2004 under, and previously incorporated herein by reference.

Each of the floor supports 102 is situated significantly below the top surface of the floor panels 106 (and does not protrude above the top surface), and the engagement surface 104 is engaged against the lower surface of the floor panels 106. More specifically, in the embodiment shown in FIG. 3, the engagement surfaces 104 are approximately "flush" (as defined below) with or recessed below the lower surfaces of the floor panels 106 (and with the payload panel 124). The payload panel 124 is a trim element around and optionally under payload components structured to carry traffic loads (people walking, etc.). If a payload panel is strong enough to beam payload loads to surrounding floor structure, then it is also considered to be the payload support serving a dual role. The engagement surface 104 may engage the lower surface of the floor panels 106 directly or indirectly, as a variety of materials or components may be disposed between the engagement surface 104 and the lower surface of the floor panels 106, including, for example, an insert spacer, a clip-nut, cork, tape, or other materials or components.

It will be appreciated that the terms "flush" and "flush with" as used in this patent application when referring to the relationship between members that support floor panels (e.g. the engagement surface 104) and one or more adjacent surfaces (e.g. the lower surfaces of the floor panels 106, or other adjacent support surfaces that engage with the lower surfaces of the floor panels 106, etc.) should be construed as including "approximately flush" or "nearly flush," and should not be construed as being limited to a precisely co-planar condition. Moreover, as used in this context, the terms "flush" and "flush with" should be understood to include a condition of not significantly protruding above such adjacent surfaces. Thus, as used in this patent application, when the engagement surface is said to be "flush" with another surface, the engagement surface and the other surface need not be precisely co-planar, but rather, may be non-planar to a limited degree as long as a floor panel may extend continuously thereover without creating a tripping hazard or other unacceptable conditions. Practically speaking, in some embodiments, the term "flush" may include an engagement surface that is up to about 0.2 inches higher than an adjacent surface. In other embodiments, the term "flush" may include an engagement surface that is up to about 0.17 inches higher than an adjacent surface as determined by an amount a floor panel is allowed to bend over uneven surfaces. In still other embodiments, the term "flush" may include an engagement surface that is up to about 0.04 inches lower than an opposing surface such as the top skin of a floor panel. In further embodiments, a greater amount of non-planarity may be acceptable within the meaning of the term "flush" as used herein.

As further shown in FIG. 3, the payload assembly 120 includes a primary component 122 coupled to a payload panel 124. The primary component 122 may be, for example, a galley, a lavatory, a passenger seat, an attendant seat, a crew seat, a closet, a cargo container, a section partition, a fireplace, shelving, a bed or other article of furniture, or any other component that may be located within the aircraft (or other vehicle or structure). For example, embodiments of the present invention may be used to secure dividing devices (or partitions) within the passenger cabin of an aircraft, as generally disclosed, for example, in U.S. Pat. No. 5,393,013 issued to Schneider et al., and to secure cargo containers as generally disclosed, for example, in U.S. Pat. No. 5,090,639 issued to Miller et al.

As further shown in FIG. 3, the payload assembly 120 further includes an intercostal 130 transversely disposed between a pair of adjacent floor supports 102. A plurality of payload attachment assemblies 140 couple the payload panel 124 to the floor supports 102. The floor supports 102 are basic and stable members of the support structure 100.

The payload panel 124 may be composed of any material or buildup that meets the requirements of the application. For example, the payload panel 124 may be a composite sandwich panel, a plywood panel, a metal sheet, or any other suitable material or structure. As noted above, the payload panels 124 may include one or more additional members (e.g. the intercostal 130) that may be added when more load carrying capability is required so that such loads may be transmitted (or beamed) to adjacent basic and stable structure (e.g. the floor supports 102).

In operation, the support structure 100 having the floor supports 102 that are "flush" with the lower surfaces of the floor panels 106 and with the lower surfaces of the payload panel 124 provide a suitable enabling architecture that allows the payload assembly 120 to be economically relocated to other positions. More specifically, the payload assembly 120 can be picked up and moved within the passenger cabin of the aircraft by detaching the attachment assemblies 140 from the floor supports 102, moving the payload assembly 120 to a new location, reattaching the attachment assemblies 140 at the new location, and sealing the periphery of the payload panel 124. The intercostal 130 moves with the payload panel 124 to the new location.

It will be appreciated that the payload assembly 124 and components thereof (e.g. payload panels, intercostals, etc.) may have a variety of alternate embodiments, and should not be construed as being limited to the particular embodiments shown and described herein, including the embodiment shown in FIG. 3. A variety of alternate embodiments of payload assemblies and payload assembly components in accordance with the teachings of the invention are described in greater detail in co-pending, commonly-owned U.S. patent application Ser. No. 10/811,771 entitled "Adaptable Payload Apparatus and Methods" filed under 10/811,529, and previously incorporated herein by reference.

Embodiments of apparatus and methods in accordance with the present invention may provide significant advantages over the prior art. For example, because the floor supports are flush with the lower surfaces of the floor panels and the payload panels, these panels are not required to "break" at the locations of the floor supports. This allows the payload assembly to be moved with greater ease and economy in comparison with the prior art. Also, because the payload intercostal 130 attaches to basic and stable floor supports 102 and is movable with the payload assembly 120, the amount of support structure that is carried on the aircraft (or other vehicle or structure) may be reduced in comparison with the prior art. More specifically, the need for supplemental support members 56 (FIG. 1) that exist in the flex-zone areas of the cabin can be eliminated. The labor and expense associated with installation of the supplemental support members 56 is therefore reduced. Also, the unnecessary weight carried aboard the aircraft (or other vehicle or structure) is reduced, and the plugs 62 that must be installed in the unused, exposed portions of the seat tracks 54 are reduced.

Figure 1:
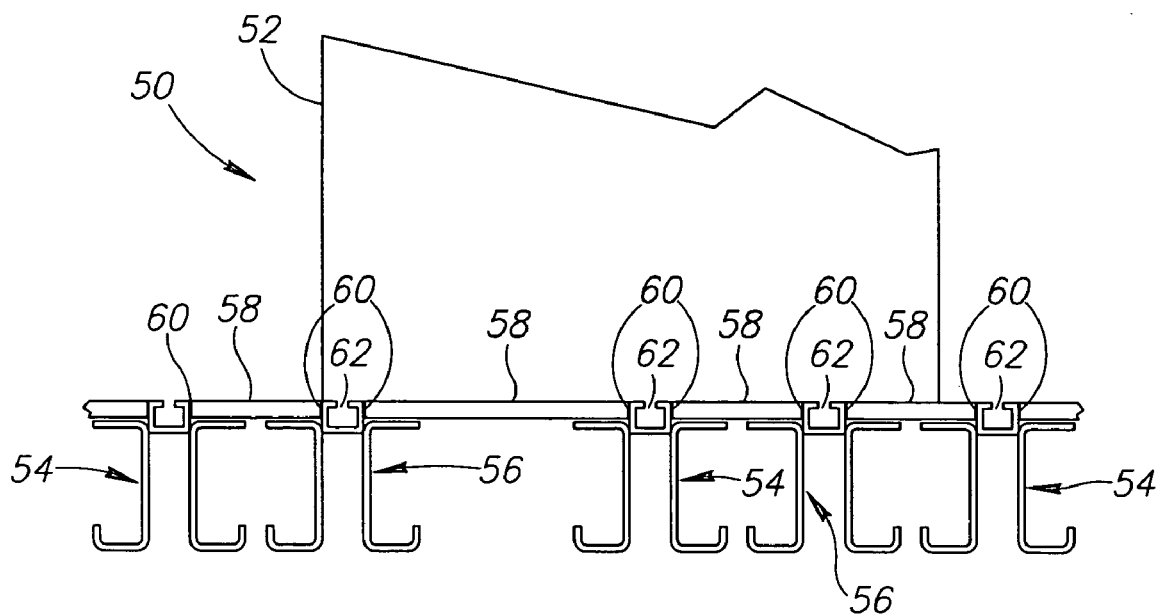
FIG. 1 is a side, partial cross-sectional view of a floor support structure and payload assembly in accordance with the prior art.
Figure 2:
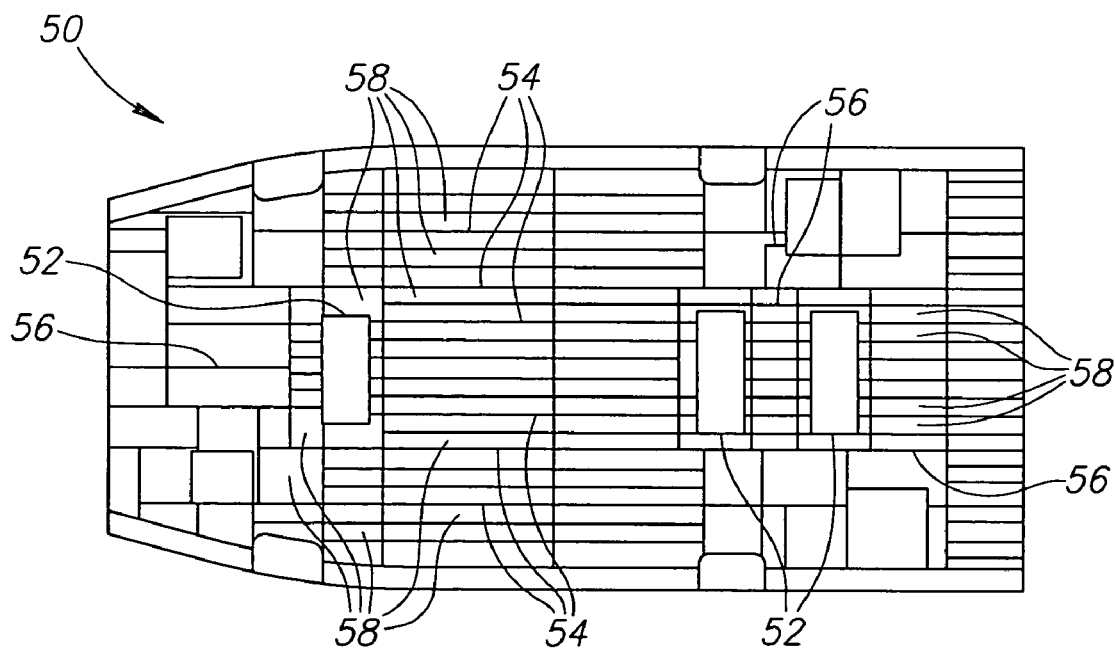
FIG. 2 is a top elevational view of a conventional floor support structure and payload assembly of FIG. 1 in accordance with the prior art.

In addition, the labor and expense associated with moving the payload assembly 120 to a new location within the aircraft is also reduced. For example, because the payload assembly 120 includes an intercostal 130 that moves with the payload assembly 120, the labor and expense associated with providing new supports at the new location is reduced or eliminated. Also, because the floor panels 106 and the payload panel 124 extend over the engagement surfaces of the floor supports 102 rather than "break" at the seat tracks 54 as shown in FIG. 1, the number of joints between the floor panels 106, 124 and the supports 102 is reduced. Therefore, the sealing requirements are simplified. More specifically, sealing between unlike materials, like the panels 106, 124 and the supports 102 is eliminated along common edges. Tape is simply applied over the joint between the floor panels 106 and the payload panel 124.

It may be appreciated that a variety of alternate embodiments in accordance with the invention may be conceived, and that the invention is not limited to the particular embodiments described above and shown in FIGS. 3–4. In the following discussion, various alternate embodiments of the invention will be described. For the sake of brevity, however, only significant differences in the structure and operation of these alternate embodiments will be described in detail. Where possible, similar components will be referenced using similar reference numbers.

Figure 5:
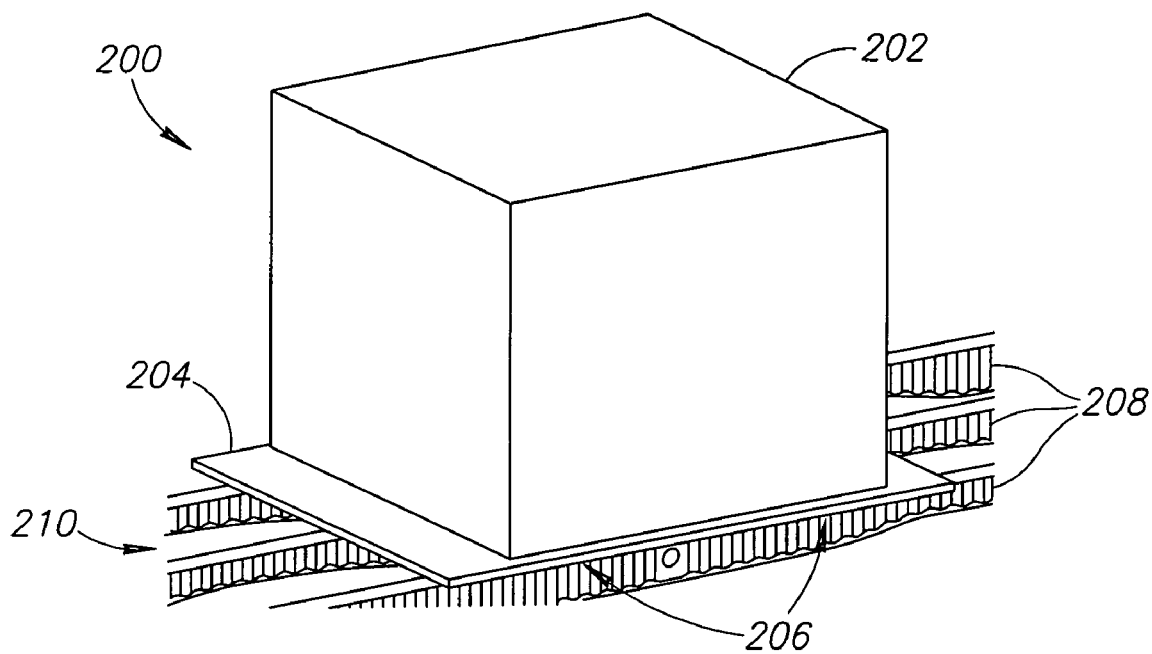
FIG. 5 is an upper isometric view of an adaptable payload assembly in accordance with an alternate embodiment of the invention.
Figure 6:
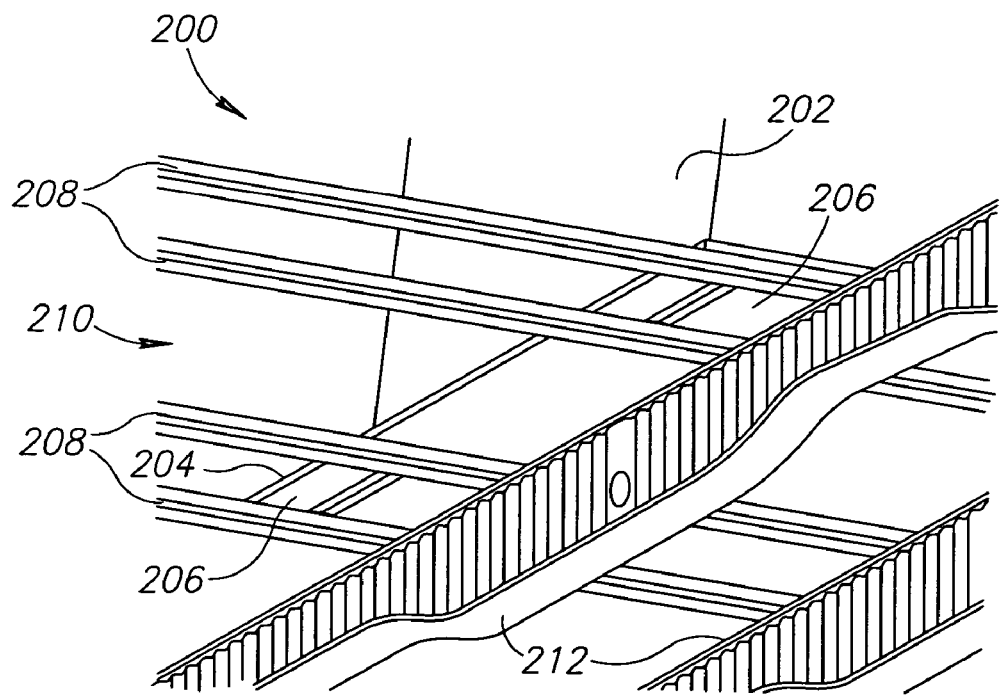
FIG. 6 is a lower isometric view of the payload assembly of FIG. 5.
Figure 7:
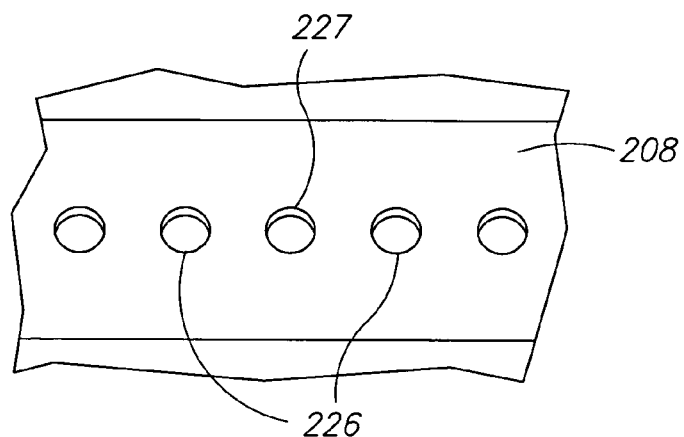
FIG. 7 is a top elevational view of an engagement member of FIG. 5.

FIG. 5 is an upper isometric view of an adaptable payload assembly 200 in accordance with an alternate embodiment of the invention. FIG. 6 is a lower isometric view of the adaptable payload assembly 200 of FIG. 5. In this embodiment, the payload assembly 200 includes a primary component 202 coupled to a payload panel 204 and payload support 206 which are, in turn, coupled to a plurality of engagement members 208. FIG. 7 is a top elevational view of one of the engagement members 208 of FIG. 5. In this embodiment, the engagement member 208 has a plurality of coupling apertures 226 disposed therein. In alternate embodiments, the engagement members 208 may have a variety of different coupling slots, apertures, or other suitable coupling mechanisms, such as the lug and opening coupling slot on existing aircraft (except a non-protruding version) or as described more fully in co-pending, commonly-owned U.S. patent application Ser. No. 11/426,848 entitled "Payload to Support Track Interface and Fitting Apparatus and Methods", filed concurrently herewith on Mar. 29, 2004 under, and previously incorporated herein by reference.

As best shown in FIG. 6, a plurality of intercostals 206 are coupled to a bottom surface of the payload panel 204. The intercostals 206 extend transversely between and over adjacent pairs of engagement members 208 of a floor assembly 210. In turn, the engagement members 208 may be engaged, as with this example, with support beams 212 of a support frame (e.g. an aircraft airframe). Thus, the payload assembly 200 may provide the above-noted advantages of flexibility, adaptability, economy and weight savings in an alternate embodiment of the invention.

Figure 8:
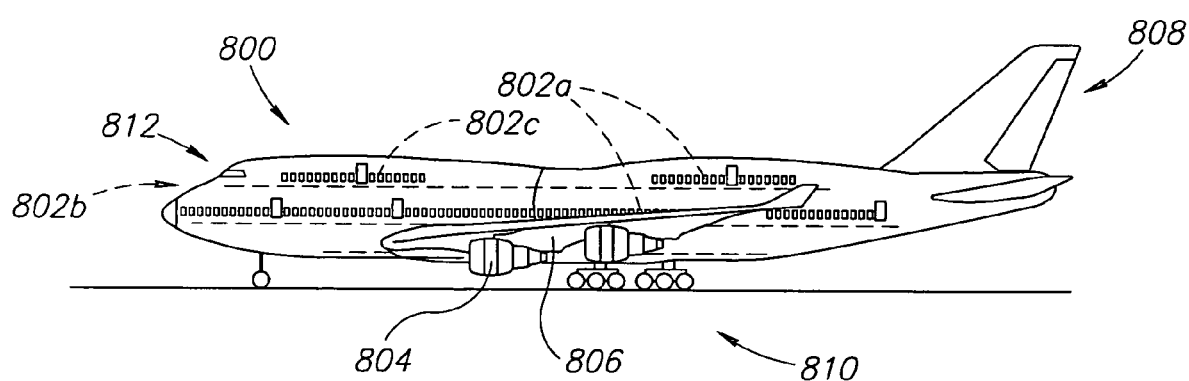
FIG. 8 is a side elevational view of an aircraft in accordance with yet another alternate embodiment of the invention.

As noted above, embodiments of the present invention may be used in a wide variety of applications, including aircraft. For example, FIG. 8 is a side elevational view of an aircraft 800 in accordance with another alternate embodiment of the present invention. In general, except for one or more assemblies 802 in accordance with the present invention, the various components and subsystems of the aircraft 800 may be of known construction and, for the sake of brevity, will not be described in detail herein. Embodiments of assemblies 802 for situating and securing payloads to support structures in accordance with the present invention may be employed in one or more desired locations throughout the aircraft 800.

More specifically, as shown in FIG. 8, the aircraft 800 includes one or more propulsion units 804 coupled to an airframe 803 (not visible) disposed within a fuselage 805, wing assemblies 806 (or other lifting surfaces), a tail assembly 808, a landing assembly 810, a control system 812 (not visible), and a host of other systems and subsystems that enable proper operation of the aircraft 800. The assemblies for situating and securing payloads to support structures in accordance with the present invention are distributed throughout the various portions of the aircraft 800, including, for example, within the cockpit (802b), the first-class section (802c), and the coach or business class section (802a).

Although the aircraft 800 shown in FIG. 8 is generally representative of a commercial passenger aircraft, including, for example, the 737, 747, 757, 767, 777, and 7E7 models commercially-available from The Boeing Company of Chicago, Ill., the inventive apparatus and methods disclosed herein may also be employed in virtually any other types of aircraft. More specifically, the teachings of the present invention may be applied to other types and models of passenger aircraft and military aircraft, and any other types of aircraft, including those described, for example, in The Illustrated Encyclopedia of Military Aircraft by Enzo Angelucci, published by Book Sales Publishers, September 2001, and in Jane's All the World's Aircraft published by Jane's Information Group of Coulsdon, Surrey, United Kingdom, which texts are incorporated herein by reference. Furthermore, alternate embodiments of apparatus and methods in accordance with the present invention may be used in the other applications, including, for example, trucks, trailers, ships, buses, trains, recreational vehicles, subways, monorails, houses, apartments, office buildings, or any other desired application.

While preferred and alternate embodiments of the invention have been illustrated and described, as noted above, many changes can be made without departing from the spirit and scope of the invention. Accordingly, the scope of the invention is not limited by the disclosure of the preferred and alternate embodiments. Instead, the invention should be determined entirely by reference to the claims that follow.

What is claimed is:

1. An assembly, comprising:
   a support structure including a plurality of elongated support beams;
   a floor assembly including a plurality of elongated engagement members coupled to the support structure, the engagement members being spaced apart and mostly parallel, each engagement member including an upwardly-facing engagement surface; and
   a payload assembly including
   a payload component positioned proximate to the floor assembly;
   at least one payload support coupled to the payload component and engaged with at least some of the engagement surfaces of the engagement members, the payload support being adapted to transfer loads from the payload component to the floor assembly and being moveable with the payload component relative to the floor assembly, and wherein the payload support includes at least one of an intercostal and a structural beam member that spans between a pair of the upwardly-facing engagement surfaces of adjacent engagement members.

2. The assembly of claim 1, wherein the payload support includes at least one of a structured payload floor panel, an intercostal and a structural beam member, and wherein the payload support spans from the payload component to at least one attachment point to and over a central load carrying axis of one or more engagement members.

3. The assembly of claim 1, wherein the payload assembly further includes at least one payload panel, the payload panel being coupled to or integral with at least one of the payload support and the payload component.

4. The assembly of claim 1, wherein the payload assembly further includes at least one payload support coupled to at least one of the engagement surfaces of the floor assembly, the engagement surface being at least one of "flush" with and recessed below a lower surface of the payload panel.

5. The assembly of claim 1, wherein the floor assembly further includes at least one floor panel coupled to at least one of the engagement surfaces, the engagement surface being at least one of "flush" with and recessed below a lower surface of the floor panel.

6. The assembly of claim 1, wherein the floor assembly further includes at least one floor panel coupled to at least one of the engagement surfaces and wherein the payload assembly further includes at least one payload panel coupled to at least one of the engagement surfaces, the payload panel being approximately co-planar with the floor panel, and wherein the engagement surface being at least one of flush with and recessed below respective lower surfaces of the floor panel and the payload panel.

7. The assembly of claim 1, wherein the payload component comprises at least one of a galley, a lavatory, a passenger seat, an attendant seat, a crew seat, a closet, a cargo container, a section partition, a fireplace, a shelf, and an article of furniture.

8. The assembly of claim 1, wherein each of the engagement surfaces is disposed on top of the engagement member and coupled to the payload assembly.

9. An aircraft, comprising:
   a fuselage operatively coupled to an airframe;
   a propulsion system operatively coupled to the airframe;
   a support structure including a plurality of elongated support members coupled to the air frame;
   a floor assembly disposed within the fuselage and coupled to the support structure, the floor assembly including a plurality of elongated engagement members coupled to the support structure, the engagement members being spaced apart and approximately parallel, each engagement member including an upwardly-facing engagement surface; and
   a payload assembly including
   a payload component positioned proximate the floor assembly;
   at least one payload support coupled to the payload component and engaged with at least some of the engagement surfaces of the engagement members, the payload support being adapted to transfer loads from the payload component to the floor assembly and being moveable with the payload component relative to the floor assembly, and wherein the payload support includes at least one of an intercostal and a structural beam member that spans between a pair of the upwardly-facing engagement surfaces of adjacent engagement members.

10. The aircraft of claim 9, wherein the payload support includes at least one of a structured payload floor panel, an intercostal, and a structural beam member, and wherein the payload support spans from the payload component to at least one attachment point to and over a central load carrying axis of one or more engagement members.

11. The aircraft of claim 9, wherein the payload assembly further includes at least one payload panel, the payload panel being coupled to or integral with at least one of the payload support and the payload component.

12. The aircraft of claim 9, wherein the payload assembly further includes at least one payload panel coupled to at least one of the engagement surfaces of the floor assembly, the engagement surface being at least one of "flush" with and recessed below a lower surface of the payload panel.

13. The aircraft of claim 9, wherein the floor assembly further includes at least one floor panel coupled to at least one of the engagement surfaces, the engagement surface being at least one of "flush" with and recessed below a lower surface of the floor panel.

14. The aircraft of claim 9, wherein the floor assembly further includes at least one floor panel coupled to at least one of the engagement surfaces and wherein the payload assembly further includes at least one payload panel coupled to at least one of the engagement surfaces, the payload panel being approximately co-planar with the floor panel, and wherein the engagement surface being at least one of flush with and recessed below respective lower surfaces of the floor panel and the payload panel.

15. The aircraft of claim 9, wherein the payload component comprises at least one of a galley, a lavatory, a passenger seat, an attendant seat, a crew seat, a closet, a cargo container, a section partition, a fireplace, a shelf, and an article of furniture.

16. The aircraft of claim 9, wherein each of the engagement surfaces is disposed on top of the member and coupled to the payload assembly.

17. A method of securing a payload to a support structure, comprising:
    providing a support structure including a plurality of elongated support beams:
    coupling a plurality of elongated engagement members of a floor assembly to the support structure, the engagement members being spaced apart and approximately parallel, each engagement member including an upwardly-facing engagement surface; and
    providing a payload assembly including a payload component and a payload support coupled to the floor assembly, the payload support being engaged with at least some of the engagement surfaces of the engagement members of the floor assembly and being moveable with the payload component relative to the engagement members, the payload support including at least one of an intercostal and a structural beam member that spans between a pair of the upwardly-facing engagement surfaces of adjacent engagement members; and
    at least partially transmitting loads from the payload component through the payload support to at least some of the engagement members, including transmitting loads through the at least one of the intercostal and the structural beam member to the to the upwardly-facing engagement surfaces of adjacent engagement members.

18. The method of claim 17, wherein providing a payload assembly includes providing a payload assembly having an elongated payload support coupled to a lower surface of the payload component and being engaged at least partially over an upper surface of the engagement members.

19. The method of claim 17, wherein providing a payload assembly includes providing a payload assembly having a transverse payload support extending from the payload component to at least one attachment locations on one or more adjacent engagement members.

20. The method of claim 19, further comprising positioning at least one floor panel adjacent to and approximately co-planar with the at least one payload panel, and coupling the at least one floor panel to at least one of the engagement members.

21. The method of claim 17, wherein providing a payload assembly including a payload component includes providing a payload assembly having at least one of a galley, a lavatory, a passenger seat, an attendant seat, a crew seat, a closet, a cargo container, a section partition, a fireplace, a shelf, and an article of furniture.

* * * * *